US005674345A

United States Patent [19]

Nash

[11] Patent Number: 5,674,345

[45] Date of Patent: Oct. 7, 1997

[54] LINERLESS LABEL PRINTER APPLICATOR

[75] Inventor: Thomas P. Nash, Getzville, N.Y.

[73] Assignee: Moore Business Forms, Inc., Grand Island, N.Y.

[21] Appl. No.: 907,511

[22] Filed: Jul. 1, 1992

[51] Int. Cl.[6] .................................................. B32B 31/00

[52] U.S. Cl. .......................... 156/264; 156/521; 156/543; 156/384; 226/96; 271/275

[58] Field of Search .................................... 156/521, 542, 156/277, 256, 264, 517, 543, 384; 226/96; 271/275

[56] References Cited

U.S. PATENT DOCUMENTS

| | | | |
|---|---|---|---|
| 2,492,908 | 12/1949 | Von Hofe | 216/55 |
| 2,639,830 | 5/1953 | Weimont | 216/23 |
| 2,695,057 | 11/1954 | Krueger | 226/96 |
| 3,140,214 | 7/1964 | Von Hofe | 156/354 |
| 3,159,521 | 12/1964 | Pechmann | 156/519 |
| 3,428,509 | 2/1969 | Messmer | 156/542 |
| 3,938,698 | 2/1976 | McDavid, Jr. | 221/73 |
| 4,124,429 | 11/1978 | Crankshaw | 156/542 |
| 4,247,353 | 1/1981 | Courtoy | 156/277 |
| 4,288,280 | 9/1981 | Morin | 156/510 |
| 4,295,915 | 10/1981 | Sakaguchi et al. | 156/361 |
| 4,321,103 | 3/1982 | Lindstrom et al. . | |
| 4,468,274 | 8/1984 | Adachi | 156/320 |
| 4,589,943 | 5/1986 | Kimball et al. | 156/256 |
| 4,707,211 | 11/1987 | Shibata | 156/354 |
| 4,708,907 | 11/1987 | Flutti et al. | 428/352 |
| 4,784,714 | 11/1988 | Shibata | 156/354 |
| 4,943,340 | 7/1990 | Ujimoto et al. | 156/519 |
| 4,978,415 | 12/1990 | Jones | 156/517 |

FOREIGN PATENT DOCUMENTS

A-2 211 471 7/1989 United Kingdom .

*Primary Examiner*—David A. Simmons
*Assistant Examiner*—Paul M. Rivard
*Attorney, Agent, or Firm*—Nixon & Vanderhye P.C.

[57] ABSTRACT

Linerless labels are produced by feeding a tape having a release coated face and an adhesive face to a hardened anvil vacuum cylinder, utilizing a non-stick circumferential surface feed roll. A knife blade on a cutting cylinder is rotated into contact with the tape at the anvil cylinder to cut the tape into linerless labels, and release liquid is applied to the blade after each cut. From the anvil cylinder the labels are deposited on a plurality of spaced conveyor tapes of circular cross section with the adhesive faces contacting the conveyor tapes. A vacuum chamber assists in holding the labels on the conveyor tapes. The release coat faces of the labels conveyed by the conveyor tapes may be heated and then printed with hot melt ink from an ink jet printer. The labels are separated from the conveyor tapes using a peeler roll and non-stick stripper rings, and then immediately contact a moving web or other elements to which they are to be applied, with the label and web passing through nip rolls to activate the pressure sensitive adhesive.

41 Claims, 2 Drawing Sheets

LINERLESS LABEL PRINTER APPLICATOR

BACKGROUND AND SUMMARY OF THE INVENTION

Because they are less expensive and more labels can be provided in a roll than conventional labels with release liners, linerless labels are achieving increased popularity. Equipment for applying linerless with rewettable or thermal sensitive adhesives to a wide variety of moving elements (such as substrates, bottles, or packages) is fairly common, such as shown in U.S. Pat. Nos. 2,492,908 and 4,468,274. However, the application of pressure sensitive adhesive labels to moving elements while known (e.g. see U.S. Pat. No. 4,978,415) is uncommon, and does not have the versatility to apply the labels to all sorts of moving elements, such as envelopes, webs, bottles, cans, and packages. Also, the linerless label typically formed utilizing the prior art equipment for applying pressure sensitive linerless labels leaves a skeletal web which must be disposed of.

According to the present invention a method and apparatus are provided which quickly, positively, and in a versatile manner apply linerless pressure sensitive adhesive labels to moving elements. The equipment and method are versatile since they may be utilized with envelopes, packages, substrates, bottles, cans, packages and a wide variety of other moving elements, and the method and apparatus typically are practiced so as to leave no skeletal web after the labels are formed, thus avoiding any necessity of disposing of any waste label material.

According to the apparatus of the present invention, means for mounting a supply of linerless label tape having a release coated face and adhesive (typically pressure sensitive adhesive) face is associated with a number of novel apparatus elements according to the invention. These novel elements include a non-stick circumferential surface feed roll, a hardened vacuum anvil cylinder cooperating with a cutting cylinder having a radially extending knife blade, which in turn cooperates with a wiper roller that applies liquid release material to the blade after each cut, and transport means having many unique features.

The transport means includes a plurality of conveyor tapes which are spaced in a direction transverse to the direction of conveyance of labels thereby, and a vacuum chamber assists the adhesive from the labels in maintaining the labels in position on the conveyor tapes during conveyance. The conveyor tapes are typically substantially circular in cross section so as to present a minimal area for engagement with the label adhesive, and the labels are separated from the conveyor tapes by a plurality of non-stick surface stripper rings which extend upwardly above the top surface of the conveyor tapes, and are associated with a peeler roller which bends the labels upwardly as they are deflected by the stripper rings. From the peeler roller and stripper rings the labels are moved directly into contact with a moving element. Where, as typical, the labels are moved into contact with moving envelopes, the labels and envelopes pass through nip rollers whereby the pressure sensitive adhesive is activated.

According to the invention, an ink jet print head may also be provided in association with the conveyor tapes for printing indicia on the release coat face of the labels just prior to removal of the labels from the conveyor tapes. If the ink is a hot melt ink, a heated platen is preferably provided over the release coat faces of the labels to heat them so that they are receptive to the hot melt ink.

Utilizing the apparatus according to the invention, a number of different methods of applying linerless labels to moving elements, the labels comprising a substrate having a release coated face and an opposite pressure sensitive adhesive coated face, are provided. One of these methods comprises the steps of: (a) Feeding tape comprising a substrate with a release coated face and an opposite pressure sensitive adhesive coated face in a first direction. (b) Cutting the tape into individual labels at a cutting position while the tape is being fed in the first direction. (c) Continuously transporting the labels away from the cutting position in a second direction. (d) Continuously printing on the release coated face while it is being transported in the second direction. And (e) continuously applying the printed labels to moving elements.

According to another method of the present invention, the following method steps are practiced for applying linerless labels to moving elements: (a) Feeding tape comprising a substrate with a release coated face and an opposite pressure sensitive adhesive coated face in a first direction by moving the adhesive coated face to contact with a non-stick circumferential rotating surface of a feed roll. (b) Cutting the tape into individual labels at a cutting position while the tape is being fed in the first direction. (c) Continuously transporting the labels away from the cutting position in a second direction. And (d) continuously applying labels to moving elements.

According to still another method of the present invention, the following method steps are practiced for applying linerless labels to moving elements: (a) Feeding tape comprising a substrate with a release coated face and an opposite pressure sensitive adhesive coated face in a first direction. (b) Cutting the tape into individual labels at a cutting position while the tape is being fed in the first direction. (c) Continuously transporting the labels away from the cutting position in a second direction, by disposing the labels on conveyor tapes, with the adhesive coated face contacting the conveyor tapes. And (d) continuously separating the labels from the conveyor tapes while simultaneously applying the separated labels to moving elements.

According to still another method of the present invention, the following method steps are practiced for applying linerless labels to moving elements: (a) Feeding tape comprising a substrate with a release coated face and an opposite pressure sensitive adhesive coated face in a first direction. (b) Cutting the tape into individual labels at a cutting position while the tape is being fed in the first direction, by bringing the release coat face of the tape into contact with a hardened anvil vacuum cylinder, and rotating a knife blade extending radially from a cutting cylinder into contact with the tape, the knife blade extending transverse to said first direction. (c) Continuously transporting the labels away from the cutting position in the second direction. And (d) continuously applying the labels to moving elements.

Typically the elements to which the labels are applied may comprise moving envelopes, in which case there is the further step of, after application of a label to a moving envelope, mechanically pressing the pressure sensitive adhesive coated face of the label into contact with the envelope to insure proper adherence between them (e.g. by passing them through a pair of nip rolls).

It is the primary object of the present invention to provide a simple yet effective apparatus and method for applying linerless labels to moving elements. This and other objects of the invention will become clear from a detailed description of the invention, and from the appended claims.

DESCRIPTION OF THE DRAWINGS

Figure 1:
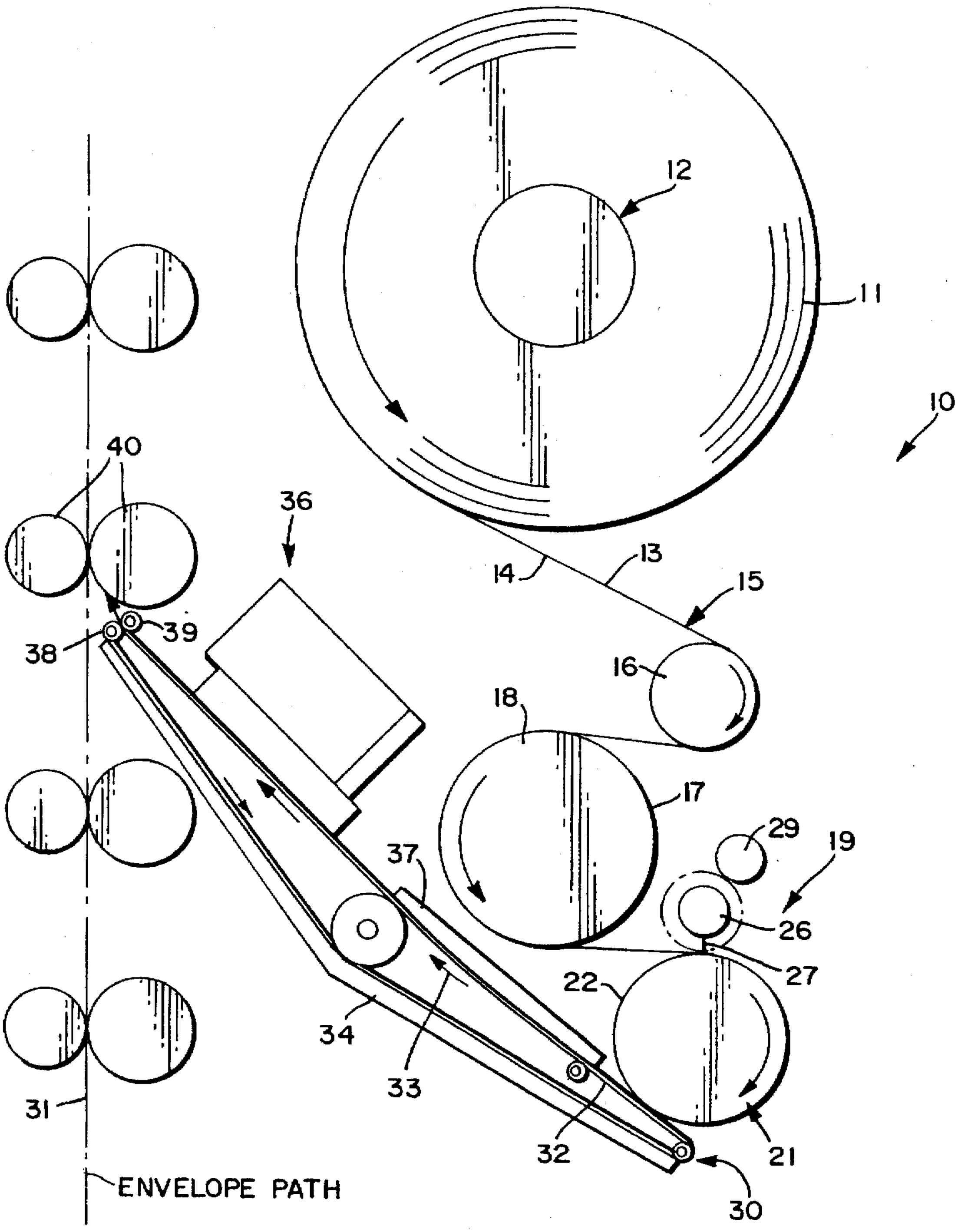
FIG. 1 is a side schematic view of exemplary apparatus according to the present invention.

Exemplary apparatus for handling linerless labels, according to the present invention, is shown generally by reference numeral 10 in FIG. 1. The first element of the apparatus 10, which is conventional, comprises means for mounting a supply of linerless label tape (typically in roll form) 11, such means preferably comprising a conventional friction unwind device shown schematically at 12 in FIG. 1. The tape of roll 11 per se is conventional, and comprises a substrate, such as plastic or paper, with a pressure sensitive adhesive side or face 13, and a release material coated face 14 (which will not stick to the pressure sensitive adhesive on face 13). In the roll configuration 11 of the tape, the release coated face 14 is on the outside.

A strip of tape 15 being taken off from the roll 11 passes with the release coated side 14 in contact with an idler roll 16, and then into contact with the non-stick circumferential surface 17 of a feed roll 18. The feed roll is driven by a conventional drive mechanism (not shown), and actually feeds the tape 15 to a cutting apparatus or position, shown generally by reference numeral 19 in FIG. 1. The pressure sensitive adhesive face 13 of the tape 15 actually make contact with the non-stick circumferential surface 17 of the feed roll 18. The non-stick surface 17 prevents adhesive build up on the feed roll 18, however it is not so slick as to prevent positive feeding of the tape 15 thereby. For example, the surface 17 may be coated with polytetrafluoroethylene, may be polished metal, or may be metal coated with a conventional release coat material used on release paper.

The cutting apparatus 19 includes a hardened anvil vacuum cylinder 21, rotatable about an axis parallel to the axes of rotation of the idler roll 16 and the feed roll 18. At least the circumferential surface 22 of the anvil vacuum cylinder 21 is hardened to preform an anvil function. A vacuum applied through cylinder 21 (vacuum cylinders per se are well known) holds the tape, and labels subsequently cut therefrom, on the peripheral surface 22. Cooperating with the hardened anvil vacuum cylinder 21 for cutting the tape 15 into individual labels 24 (see FIG. 2, 4 and 5) there is provided a cutting cylinder 26 having a radially extending knife blade 27 (or radially spaced knife blades if desired). The cylinder 26 is rotatable about an axis parallel to the axis of the anvil cylinder 21, and means are provided (such as a frame) for mounting the cutting cylinder 26 adjacent the anvil cylinder 21 so that the cutting blade just barely makes contact with the hardened surface 22 of the cylinder 21.

In order to prevent the knife blade 27 from sticking to the tape 15 as it is cutting the labels 24, a small amount of liquid release material is applied to the blade 27 between successive cuts. This is accomplished by the idler wiper roll 29 which is a felt roll impregnated with release material, and is mounted for rotation about an axis parallel to the axis of rotation of the cutting cylinder 26, and adjacent the cylinder 26, so that as the blade 27 is rotated away from contact with the hardened anvil surface 22 of the cylinder 21, it engages the felt and picks up a small amount of release liquid, incrementally rotating the wiper roll 29 as it does so.

The cut length of the labels 24 are determined by the ratio of the feed roll 18 revolutions to cutting cylinder 26 revolutions (and number of cutting blades 27). This ratio may be changed by conventional mechanisms such as gears, single revolution clutches, or servo-motor controls.

The anvil vacuum cylinder 21 transports the cut labels 24 into association with a transport mechanism, shown generally by reference numeral 30, away from the cylinder 21, ultimately into contact with moving elements, such as envelopes moving in the path 31. The transport mechanism 30 preferably comprises a plurality of conveyor tapes 32 which receive the adhesive face of the labels 24. While the adhesive on the adhesive face of the label 24 facilitates adherence of the labels 24 to the conveyor tapes 32 so that they can convey the labels in a transport direction 33 (see FIG. 1), in order to insure that the labels stay in place until it is desired to remove them, a vacuum chamber 34 also is preferably provided. The vacuum pulls air through the spaces between the conveyor tapes 32, thereby providing a force holding labels 24 on the conveyer tapes 32.

While the labels 24 are being transported in direction 33 by the conveyor tapes 32, it may be desirable to print indicia on the release coated faces 14 thereof. For this purpose an ink jet print head 36, or like structure, may be provided. If the ink jet print head applies hot melt ink, just prior to the print head 36 a heated platen 37 is preferably provided for heating the release coat face 14 of the labels 24 to make them receptive for the ink from the print head 36. Once the labels 24 have been printed and it is desired to apply them to the moving elements, such as envelopes in path 31, in addition to removing the force of the vacuum chamber 34 it is desirable to positively separate the labels 24 from the conveyor tapes 32. For this purpose, a plurality of stripper elements, such as stripper rings 38 having non-stick circumferential surfaces, associated with a peeler roll 39, are provided. After separation of the labels 24 from the conveyor tapes 32, the pressure sensitive face 13 of each label 24 is fed into contact with an envelope 47 (see FIG. 5) in path 31, and the envelope with label applied is passed through nip rolls 40 whereby the pressure sensitive adhesive is activated to insure adherence of the label 24 onto the envelope 47 moving in path 31.

Figure 2:
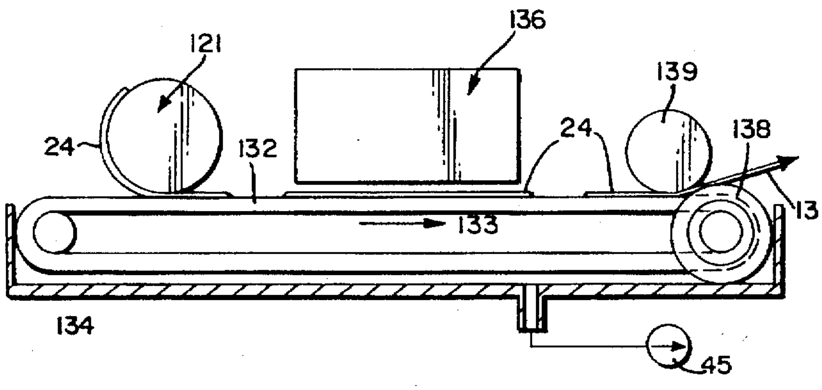
FIG. 2 is a more detailed side view of a revised form of the transport mechanism of the apparatus of FIG. 1, diagrammatically showing labels being placed on and peeled from conveyor tapes.
Figure 3:
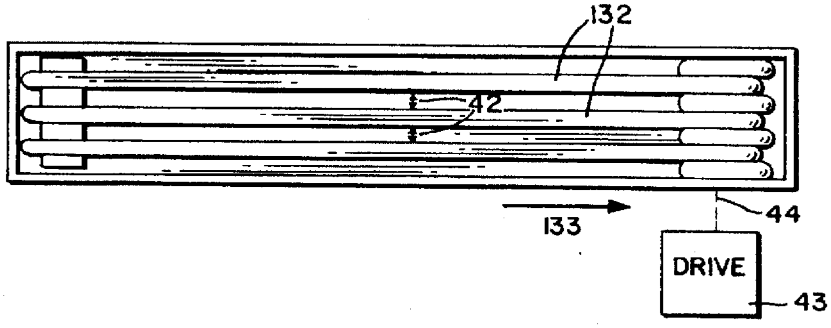
FIG. 3 is a top plan view of the conveyor tapes and stripper rings of the transport mechanism of FIG. 2.
Figure 4:
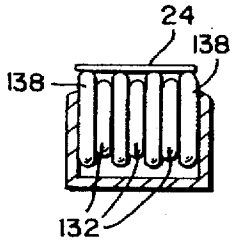
FIG. 4 is a is an end view at the stripper rings of the components of the transport mechanism of FIG. 3 shown in association with a label.

A more detailed illustration of the transport mechanism 30, especially the stripper rings and conveyor tapes, is provided in FIGS. 2 through 4. For ease of illustration, the components shown in FIGS. 2 through 4 are simplified compared to those in FIG. 1. Components in the FIGS. 2 through 4 embodiment comparable to those in the FIG. 1 embodiment are shown by the same reference numeral only preceded by a "1".

The conveyor tapes 132 transport the labels 24 in transport direction 133, and are spaced from each other—see spaces 42 in FIG. 3—in a dimension perpendicular to the direction 133. The conveyor tapes 132 preferably are substantially circular in cross section so as to provide a minimal area of contact with the labels 24. A conventional drive 43 is provided for driving the conveyor tapes 132. The vacuum chamber 134 is connected up to a vacuum pump 45 or the like, which draws air through the spaces 42 and facilitates holding of the labels 24 on the conveyor tapes 132.

Where it is desirable to remove the labels 24 from the conveyor tapes 132, a separating mechanism will be provided. The separating mechanism comprises the stripper elements, preferably stripper rings, 138 which extend upwardly above the tops of the conveyor tapes 132 to deflect each label 24 away from the tapes 132, as seen in FIGS. 2 and 4. The stripper rings 138, at least the portions that will contact the adhesive faces 13 of the labels 24, are of non-stick material, such as polytetrafluoroethylene. The peeler roll 139, mounted for rotation about an axis parallel to that of the vacuum cylinder 121, is provided just above the conveyor tapes 132 and just prior to the stripper rings 138. The peeler roller 139 aids in removing the labels 24 from the conveyor tapes 132 by causing an upward bend in each label 24, thus causing it to travel in a direction that is tangent to both the peeler roll 139 and the stripper rings 138, and to be deflected by the rings 138 as illustrated in FIG. 2. The stripper rings 138 can rotate with the drive shaft 44, or they could be loosely mounted on the drive shaft 44 so that relative rotation between them is possible.

Figure 5:
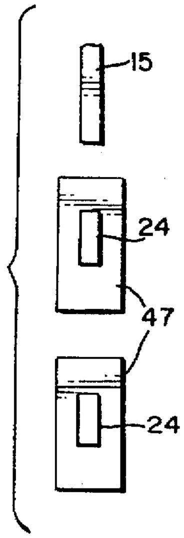
FIG. 5 schematically illustrates the label tape alone and after severing and placement on individual envelopes.

FIG. 5 schematically illustrates the basic actions that are performed according to the method of the invention; the tape 15 being severed to form the individual labels 24, which are then applied onto envelopes 47 (or like moving elements) traveling in the path 31. The envelopes 47 may be transported individually in path 31, or may be mounted on a web.

In a typical method of operation, the tape 15 is withdrawn from the roll 11 and fed by feed roll 18 into association with the cutting apparatus 19. The cutting cylinder 26 rotates to bring the blade 27 into contact with the tape 15 and the hardened surface 22 of the anvil roll 21, the vacuum cylinder 21 then depositing the linerless label 24 that has been cut from tape 15 onto the conveyor tapes 32, 132 with the adhesive face 13 of the label 24 on the conveyor tape 32, 132. Then the label 24 is printed by the ink jet print head 36, 136, and is separated from the conveyor tapes by the stripper rings 38, 138 and peeler roll 39, 139, and applied directly onto a moving envelope 47 in path 31. The label 24 and envelope 47 then move between the nip rolls the pressure sensitive adhesive being activated, and the final product produced, as seen in FIG. 5.

It will thus be seen that according to the present invention a simple yet effective method and apparatus have been provided for handling linerless labels and applying them onto moving elements. While the invention has been herein shown and described in what is presently conceived to be the most practical and preferred embodiment, it will be apparent to those of ordinary skill in the art that many modifications may be made thereof within the scope of the invention, which scope is to be accorded the broadest interpretation of the appended claims so as to encompass all equivalent apparatus and methods.

What is claimed is:

1. Apparatus for handling linerless labels, comprising:

means for mounting a supply of linerless label tape having a release coated face and an adhesive face;

an anvil vacuum cylinder;

a rotatable cutting cylinder with radially extending knife blade;

means for substantially continuously feeding the tape from said anvil vacuum cylinder so that the release coated face is in contact with said anvil vacuum cylinder;

means for mounting said cutting cylinder next to, and for rotation about an axis parallel to the axis of, said anvil cylinder so that said knife cuts the tape into individual linerless labels, severing a portion of the tape forming an individual label from the rest of the tape in a dimension transverse to the direction of feed of the tape at said anvil vacuum cylinder; and means for transporting the individual linerless labels away from said anvil vacuum cylinder, in a transport direction, and comprising a plurality of conveyor tapes spaced from each other in a direction substantially transverse to said transport direction, the individual labels being delivered to the tapes with the adhesive face contacting the conveyor tapes.

2. Apparatus as recited in claim 1 further comprising a wiper roll, and means for mounting said wiper roll next to, and for rotation about an axis parallel to the axis of, said cutting cylinder so that said knife comes into contact with said wiper roll after said knife cuts the tape.

3. Apparatus as recited in claim 2 wherein said means for substantially constantly feeding the tape from the supply to said anvil vacuum cylinder includes a feed roll with a non-stick circumferential surface, adjacent to, and rotatable about an axis parallel to the axis of, said anvil vacuum cylinder, so that the adhesive face of the tape comes in contact with the non-stick surface of said feed roll, said non-stick surface preventing the buildup of adhesive on said feed roller, but not being so slippery as to prevent positive feeding of the tape by said feed roll.

4. Apparatus as recited in claim 1 further comprising means for applying a liquid release material to said knife blade after each cut of the tape therewith.

5. Apparatus as recited in claim 1 wherein said means for substantially constantly feeding the tape from the supply to said anvil vacuum cylinder includes a feed roll with a non-stick surface, adjacent to, and rotatable about an axis parallel to the axis of, said anvil vacuum cylinder, so that the adhesive face of the tape comes in contact with the non-stick surface of said feed roll, said non-stick surface preventing the buildup of adhesive on said feed roller, but not being so slippery as to prevent positive feeding of the tape by said feed roll.

6. Apparatus as recited in claim 1 wherein said conveyor tapes are substantially circular in cross section so as to provide minimal areas of contact with the labels.

7. Apparatus as recited in claim 6 wherein said transporting means further comprise a vacuum chamber assisting in holding the labels on the conveyor tapes to be transported thereby.

8. Apparatus as recited in claim 1 further comprising means for effecting separation of the labels from said conveyor tapes to facilitate application of the labels onto a receiving element.

9. Apparatus as recited in claim 8 wherein said means for effecting separation comprise a plurality of stripper elements mounted between said conveyor tapes and having non-stick surfaces thereof gradually extending above said conveyor tapes to deflect the labels away from said conveyor tapes.

10. Apparatus as recited in claim 9 further comprising a peeler roll mounted above said conveyor tapes adjacent where said stripper elements extend above said conveyor tapes, and adjacent the labels being transported by said conveyor tapes so as to cause, in conjunction with said stripper elements, the labels to travel away from said conveyor tapes.

11. Apparatus as recited in claim 9 wherein said stripper elements are stripper rings having a non-stick circumferential surface.

12. Apparatus as recited in claim 1 further comprising printing means mounted in association with said conveyor tapes for printing indicia on the release coated face of the labels being conveyed by said conveyor tapes.

13. Apparatus as recited in claim 12 wherein said printing means comprises an ink jet printer.

14. Apparatus as recited in claim 13 wherein said ink jet printer prints with hot melt ink; and further comprising a heater mounted above said conveyor tapes just before said printer in said transport direction.

15. A method of applying linerless labels to moving elements, the labels comprising a substrate having a release coated face and an opposite pressure sensitive adhesive coated face, comprising the steps of:

(a) feeding tape comprising a substrate with a release coated face and an opposite pressure sensitive adhesive coated face in a first direction;

(b) cutting the tape into individual labels at a cutting position while the tape is being fed in the first direction;

(c) continuously transporting the labels away from the cutting position in a second direction;

(d) continuously printing on the release coated face while it is being transported in the second direction; and (e) continuously applying the printed labels to moving elements.

16. A method as recited in claim 15 wherein step (d) is practiced by ink jet printing.

17. A method as recited in claim 15 wherein step (d) is practiced by ink jet printing with hot melt ink; and comprising the further step of heating the release coated face of the labels during the practice of step (c) just prior to the practice of step (d).

18. A method as recited in claim 15 wherein the elements to which the labels are applied comprise moving envelopes; and comprising the further step, after application of a label to a moving envelope, of mechanically pressing the pressure sensitive adhesive coated face of the label into contact with the envelope to insure proper adherence between them.

19. Apparatus for handling linerless labels comprising:

means for mounting a supply of linerless label tape having a release coated face and an adhesive face;

cutting means for cutting the tape into individual linerless labels;

means for substantially continuously feeding the tape from said supply to said cutting means, said feeding means comprising a feed roll with a non-stick circumferential surface preventing the build up of adhesive on said feed roll, but not being so slippery as to prevent positive feeding of the tape by said feed roll, and means for directing the tape into contact with said feed roll so that the adhesive face of the tape engages the non-stick circumferential surface of said feed roll said feed roll being the only mechanical element engaging said tape at the portion of said tape engaged thereby; and means for transporting the individual linerless labels away from said cutting means.

20. Apparatus for handling linerless labels comprising:

means for mounting a supply of linerless label tape having a release coated face and adhesive face;

cutting means for cutting the tape into individual linerless labels;

means for substantially continuously feeding the tape from said supply to said cutting means; and means for transporting the individual linerless labels away from said cutting means, in a transport direction, said transporting means comprising a plurality of conveyor tapes spaced from each other in a direction substantially transverse to said transport direction, the individual labels being delivered to the conveyor tapes with their adhesive faces contacting the conveyor tapes, said conveyor tapes being substantially circular in cross section so as to provide minimal areas of contact with the labels.

21. Apparatus as recited in claim 20 wherein said transporting means further comprise a vacuum chamber assisting in holding the labels on the conveyor tapes to be transported thereby.

22. Apparatus as recited in claim 20 further comprising means for effecting separation of the labels from said conveyor tapes to facilitate application of the labels onto a receiving element.

23. Apparatus as recited in claim 22 further comprising a peeler roll mounted above said conveyor tapes adjacent where said stripper elements extend above said conveyor tapes, and adjacent the labels being transported by said conveyor tapes so as to cause, in conjunction with said stripper elements, the labels to travel away from said conveyor tapes.

24. Apparatus as recited in claim 24 wherein said stripper elements are stripper rings having non-stick circumferential surfaces.

25. Apparatus as recited in claim 20 further comprising printing means mounted in association with said conveyor tapes for printing indicia on the release coated face of the labels being conveyed by said conveyor tapes.

26. Apparatus as recited in claim 25 when said printing means comprises an ink jet printer which prints with hot melt ink; and further comprising a heater mounted above said conveyor tapes just before said printer in said transport direction for heating labels before the hot melt ink is applied thereto.

27. Apparatus for conveying, and then discharging from the conveyor, elements having a sticky face, comprising:

a plurality of conveyor tapes spaced from each other in a first direction;

means powering said power conveyor tapes so that they transport sticky faced elements thereon in a second direction, substantially perpendicular to said first direction, including a shaft, said conveyor tapes passing over said shaft; and means for effecting separation of the sticky faced elements being conveyed by said conveyor tapes, said separation effecting means comprising a plurality of stripper rings mounted on said shaft between said conveyor tapes and having non-stick surfaces thereof gradually extending above said conveyor tapes to deflect the sticky faced elements away from said conveyor tapes.

28. A method of applying linerless labels to moving elements, the labels comprising a substrate having a release coated face and an opposite pressure sensitive adhesive coated face, comprising the steps of:

(a) feeding tape comprising a substrate with a release coated face and an opposite pressure sensitive adhesive coated face in a first direction by moving the adhesive coated face to contact with a non-stick circumferential rotating surface of a feed roll the feed roll being the only mechanical element engaging the tape at the portion of the tape engaged thereby;

(b) cutting the tape into individual labels at a cutting position while the tape is being fed in the first direction;

(c) continuously transporting the labels away from the cutting position in a second direction; and (d) continuously applying the labels to moving elements.

29. A method as recited in claim 28 wherein the elements to which the labels are applied comprise moving envelopes;

and comprising the further step, after application of a label to a moving envelope, of mechanically pressing the pressure sensitive adhesive coated face of the label into contact with the envelope to insure proper adherence between them.

30. A method of applying linerless labels to moving elements, the labels comprising a substrate having a release coated face and an opposite pressure sensitive adhesive coated face, comprising the steps of:

(a) feeding tape comprising a substrate with a release coated face and an opposite pressure sensitive adhesive coated face in a first direction;

(b) cutting the tape into individual labels at a cutting position while the tape is being fed in the first direction;

(c) continuously transporting the labels away from the cutting position in a second direction, by disposing the labels on conveyor tapes, with the adhesive coated face contacting the conveyor tapes; and (d) continuously separating the labels from the conveyor tapes while simultaneously applying the separated labels to moving elements.

31. A method as recited in claim 30 wherein the elements to which the labels are applied comprise moving envelopes; and comprising the further step, after application of a label to a moving envelope, of mechanically pressing the pressure sensitive adhesive coated face of the label into contact with the envelope to insure proper adherence between them.

32. A method as recited in claim 30 wherein separating step is accomplished by simultaneously bending and mechanically deflecting the labels away from the conveyor tapes.

33. Apparatus for handling linerless labels, comprising:

means for mounting a supply of linerless label tape having a release coated face and an adhesive face;

an anvil vacuum cylinder;

a rotatable cutting cylinder with radially extending knife blade;

means for substantially continuously feeding the tape from said supply to said anvil vacuum cylinder so that the release coated face is in contact with said anvil vacuum cylinder, comprising a feed roll with a non-stick surface, adjacent to, and rotatable about an axis parallel to the axis of, said anvil vacuum cylinder, so that the adhesive face of the tape comes in contact with the non-stick surface of said feed roll, said non-stick surface preventing the buildup of adhesive on said feed roller, but not being so slippery as to prevent positive feeding of the tape by said feed roll, said feed roll being the only mechanical element engaging said tape at the portion of said tape engaged thereby;

means for mounting said cutting cylinder next to, and for rotation about an axis parallel to the axis of, said anvil cylinder so that said knife cuts the tape into individual linerless labels, severing a portion of the tape forming an individual label from the rest of the tape in a dimension transverse to the direction of feed of the tape at said anvil vacuum cylinder;

means for transporting the individual linerless labels away from said anvil vacuum cylinder; and a wiper roll, and means for mounting said wiper roll next to, and for rotation about an axis parallel to the axis of, said cutting cylinder so that said knife comes into contact with said wiper roll after said knife cuts the tape.

34. Apparatus for conveying, and then discharging from the conveyor, elements having a sticky face, comprising:

a plurality of conveyor tapes spaced from each other in a first direction;

means powering said power conveyor tapes so that they transport sticky faced elements thereon in a second direction, substantially perpendicular to said first direction;

means for effecting separation of the sticky faced elements being conveyed by said conveyor tapes, said separation effecting means comprising a plurality of stripper elements mounted between said conveyor tapes and having non-stick surfaces thereof gradually extending above said conveyor tapes to deflect the sticky faced elements away from said conveyor tapes; and a peeler roll mounted above said conveyor tapes adjacent where said stripper elements extend above said conveyor tapes, and adjacent the sticky faced elements being transported by said conveyor tape so as to cause, in conjunction with said stripper elements, the sticky faced elements to travel away from said conveyor tapes.

35. Apparatus as recited in claim 34 wherein said stripper elements are stripper rings each having a non-stick circumferential surface.

36. Apparatus as recited in claim 35 wherein said conveyor tapes are substantially circular in cross section so as to provide minimal area of contact with the sticky faced elements.

37. Apparatus as recited in claim 35 further comprising a vacuum chamber assisting in holding the sticky faced elements being conveyed by said conveyor tapes thereon.

38. Apparatus as recited in claim 27 wherein said rings are loosely mounted on said shaft so that relative motion occurs therebetween.

39. Apparatus as recited in claim 19 wherein said feed roll non-stick circumferential surface comprises a polyethylene coating, polished metal, or metal coated with a conventional release coat used on release paper.

40. Apparatus for handling linerless labels comprising:

means for mounting a supply of linerless label tape having a release coated face and adhesive face;

cutting means for cutting the tape into individual linerless labels;

means for substantially continuously feeding the tape from said supply to said cutting means;

means for transporting the individual linerless labels away from said cutting means, in a transport direction, said transporting means comprising a plurality of conveyor tapes spaced from each other in a direction substantially transverse to said transport direction, the individual labels being delivered to the conveyor tapes with their adhesive faces contacting the conveyor tapes; and a plurality of stripper elements mounted between said conveyor tapes and having non-stick surfaces thereof gradually extending above said conveyor tapes to deflect the labels away from said conveyor tapes to facilitate application of the labels onto a receiving element.

41. Apparatus as recited in claim 33 wherein said feed roll non-stick circumferential surface comprises a polyethylene coating, polished metal, or metal coated with a conventional release coat used on release paper.

* * * * *